United States Patent

[11] 3,623,936

[72] Inventor Peter Hotz
    Wilkinsburg Borough, Pa.
[21] Appl. No. 654,722
[22] Filed July 20, 1967
[45] Patented Nov. 30, 1971
[73] Assignee United States Steel Corporation

[54] HONEYCOMB CORE CONSTRUCTION FOR PANELS
    2 Claims, 3 Drawing Figs.

[52] U.S. Cl. .................................................. 161/68,
    29/160, 52/615, 52/668, 174/72 A
[51] Int. Cl. .................................................. B32b 3/12
[50] Field of Search .......................................... 156/197,
    202, 204; 161/68, 69, 113, 127, 139; 29/455 LM,
    160; 52/615, 667, 668; 217/30, 31; 229/42;
    174/72 A

[56] References Cited
    UNITED STATES PATENTS
    1,024,001  4/1912  Forsyth .......................... 52/668
    1,620,846  3/1927  Wells ............................. 52/667 X
    1,908,864  5/1933  Reid .............................. 161/69 X
    2,234,517  3/1941  Coffman ......................... 161/113
    1,539,397  5/1925  Matravers ....................... 35/48
    1,999,361  4/1935  James et al. .................... 229/42
    2,029,679  2/1936  Seving et al. ................... 161/139 X
    2,960,197  11/1960 Langhans ........................ 52/615
    3,044,586  7/1962  Cassels .......................... 52/668
    3,214,212  10/1965 Horton .......................... 161/115 X Primary Examiner—John T. Goolkasian
Assistant Examiner—Henry F. Epstein
Attorney—Walter P. Wood ABSTRACT: A honeycomb core for fabricated metal panels. Core is formed of channels having openings which interfit with similar reversed channels. Facing sheets have face-to-face contact with webs of channels. Panel has continuous edge-to-edge passages both lengthwise and crosswise.

PATENTED NOV 30 1971   3,623,936

INVENTOR
PETER HOTZ
By Donald G. Dalton
Attorney

HONEYCOMB CORE CONSTRUCTION FOR PANELS

This invention relates to a fabricated metal panel which has an improved honeycomb core construction.

A conventional honeycomb core is made from strips of metal or like bonded and expanded to form hexagonal or rectangular cells. Flat facing sheets are bonded to each side of the core to form a sandwich. The bond must be effected between flat sheets and the edges of the core material, and it is difficult to achieve a good bond under such conditions. Another disadvantage is that a panel constructed with this type of core has no passages from edge to edge, as are needed for running pipes or electric wiring through the panel.

An object of my invention is to provide a fabricated panel, the honeycomb core of which is constructed in a way to overcome the foregoing difficulties; that is, to achieve face-to-face bonds between the core and the facing sheets and to furnish continuous passages edge-to-edge both lengthwise and crosswise of the panel.

A further object is to provide an improved honeycomb core which comprises a plurality of interfitting channels preferably formed by cutting and folding sheets of metal foil or the like.

Figure 1:
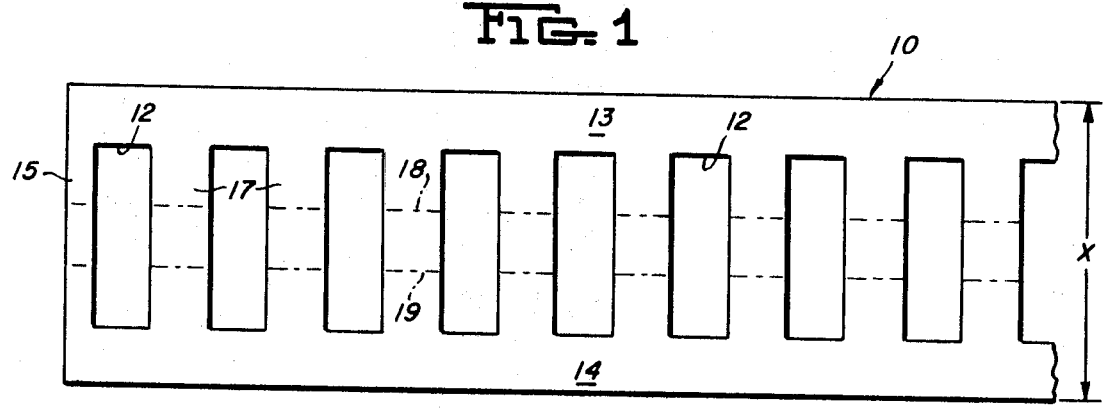
FIG. 1 is a plan view of a blank cut in preparation for forming one of the channels embodied in the core.
Figure 2:
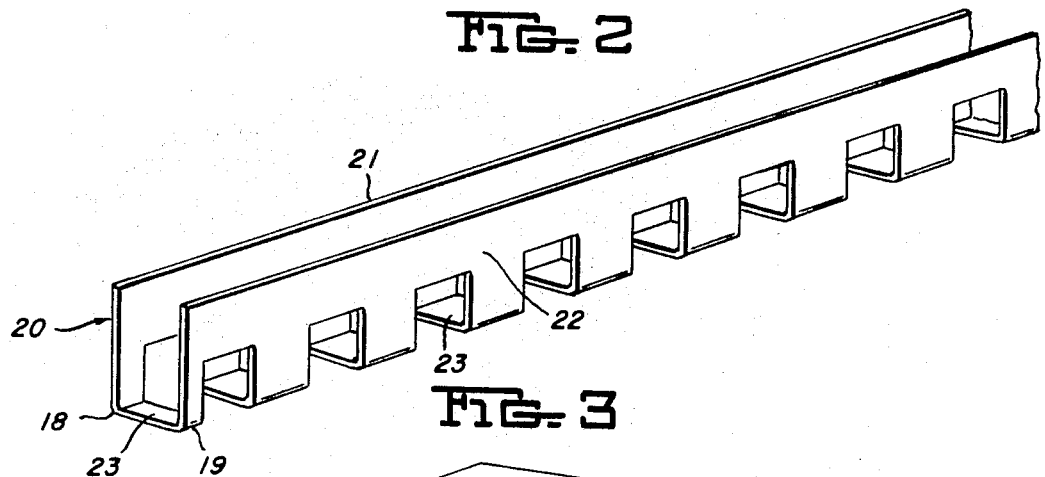
FIG. 2 is a perspective view of a channel formed from the blank shown in FIG. 1.
Figure 3:
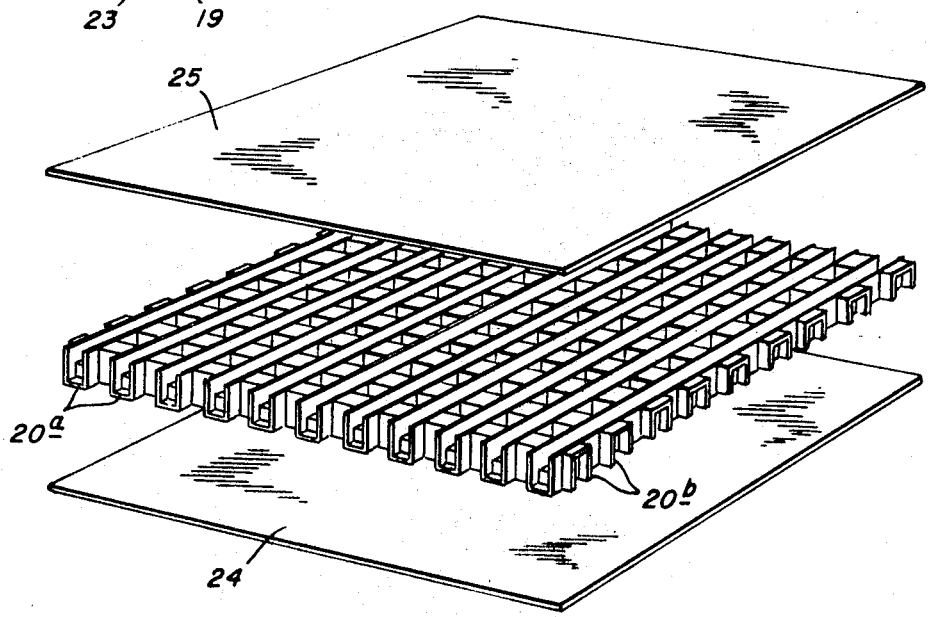
FIG. 3 is an exploded perspective view of a panel which has a core made up of channels like that shown in FIG. 2.

As FIG. 1 shows, I form each channel of my honeycomb core from an elongated blank 10 of a length equal to the panel length or width. The width X of the blank is 2½ times the thickness of the core. I cut or punch a series of transverse rectangular openings 12 in the blank, leaving uncut rectangular areas 13 and 14 along the sides of the blank, rectangular areas 15 at the ends, and rectangular strips 17 between openings. The dimensions of each opening 12 and each strip 17 are one-fifth X by three-fifths X (with necessary tolerances to enable the parts to fit together as hereinafter described). The width of each uncut area 13 and 14 along the sides is one-fifth X. Conveniently the dimension of each end area 15 lengthwise of the blank is one-tenth X, but this dimension is not critical. Next I fold the blank along two lines 18 and 19 parallel to the side edges of the blank to form channels 20, as FIG. 2 shows. The distance between each fold line 18 and 19 and the nearer side edge of the blank is two-fifths X. Thus each channel has flanges 21 and 22 of a height two-fifths X and a web 23 of a width one-fifth X. Next I interfit a plurality of lengthwise channels 20a and a plurality of reversed crosswise channels 20b, as FIG. 3 shows. Finally I apply facing sheets 24 and 25, either by welding or with a suitable adhesive. Conveniently the facing sheets and blanks can be of 0.002-inch thick steel foil, although the thickness is not critical and I can use other materials.

A panel formed with my improved honeycomb core has face-to-face bonds between the webs 23 of the lengthwise channels 20a and the facing sheet 24, and likewise between the web 23 of the crosswise channels 20b and the facing sheet 25. The facing sheets lock the interfitted channels together. As viewed in FIG. 3, the upper half of each lengthwise channel 20a is unobstructed throughout the length of the panel, and the lower half of each crosswise channel 20b is unobstructed throughout the width. Hence the panel has continuous passages edge-to-edge both lengthwise and crosswise available when needed, for example, to accommodate pipes or electric wiring. It is apparent also that I could form channels of the configuration shown in FIG. 2 by other procedures than cutting and folding a blank.

While I have shown and described only a single embodiment of my invention, it is apparent that modifications may arise. Therefore, I do not wish to be limited to the disclosure set forth but only by the scope of the appended claims.

I claim:

1. A fabricated panel comprising a core and facing sheets on opposite faces of said core;

said core being formed by interfitting a plurality of lengthwise channels and a plurality of crosswise channels;

each of said lengthwise and each of said crosswise channels being of a configuration obtained by folding an elongated rectangular blank which has a width equal to five halves of the core thickness and a length equal to the lengthwise dimension on the crosswise dimension respectively of the core;

each blank having prior to folding a series of unobstructed transverse rectangular openings, leaving rectangular areas along the sides of the blank and rectangular strips between said openings;

the dimensions of each of said openings and each of said strips being one-fifth the width of the blank by three-fifths the width of the blank;

the width of each of said areas being one-fifth the width of the blank;

each blank being folded along two lines parallel to the side edges in forming said channels, the distance between each fold line and the nearer side edge being two-fifths the width of the blank, whereby said channels have flanges of a height each equal to two-fifths the width of the blank and a web of a width equal to one-fifth the width of the blank;

said crosswise channels being reversed with respect to said lengthwise channels when the channels are interfitted;

said facing sheets being fixed to the webs of said channels and having face-to-face contact with said webs.

2. A panel as defined in claim 1 having continuous lengthwise and crosswise passages extending edge-to-edge.

* * * * *